Jan. 21, 1964    A. R. NORDEN    3,119,051
CIRCUIT BREAKERS AND PANELBOARD ASSEMBLIES THEREFOR
Filed April 24, 1959    2 Sheets-Sheet 1
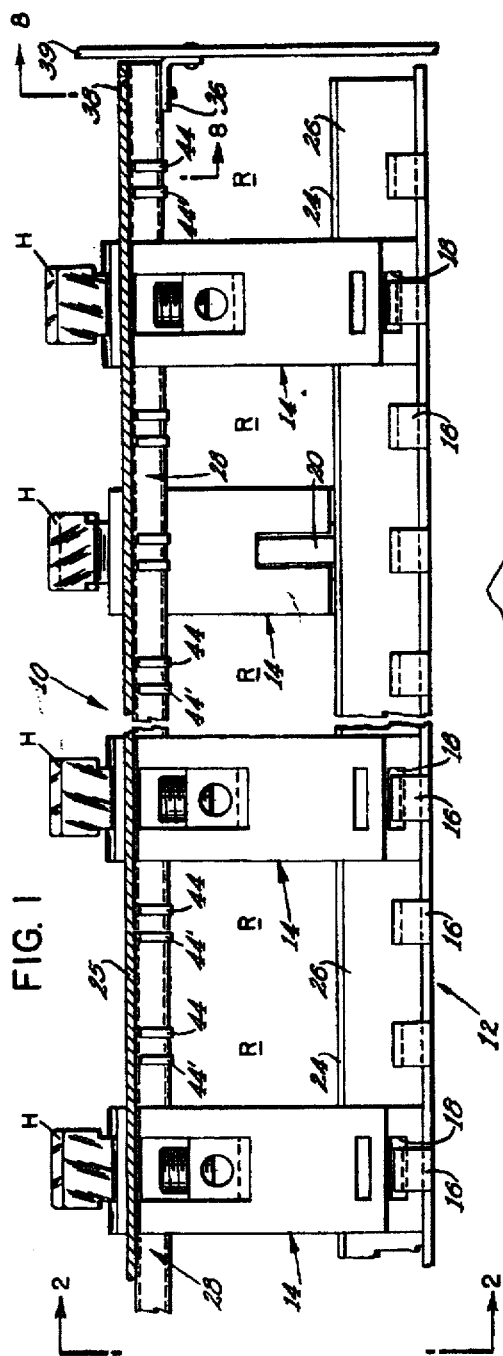
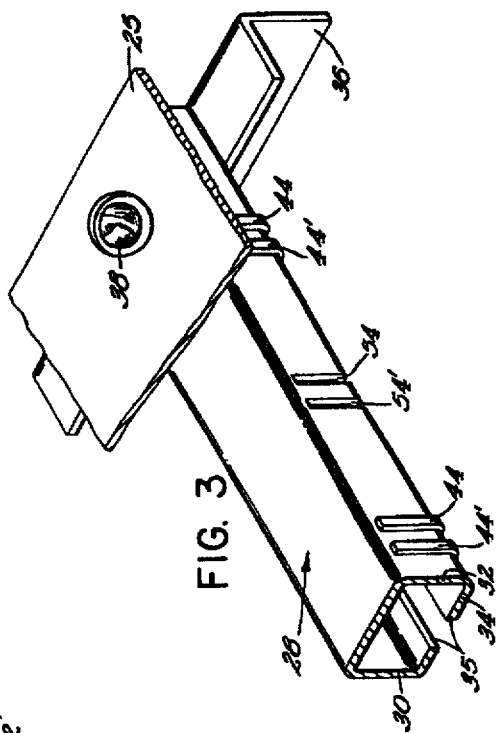
*INVENTOR.*
ALEXANDER R. NORDEN
BY
*Paul S Martin*
ATTORNEY Jan. 21, 1964   A. R. NORDEN   3,119,051
CIRCUIT BREAKERS AND PANELBOARD ASSEMBLIES THEREFOR
Filed April 24, 1959   2 Sheets-Sheet 2
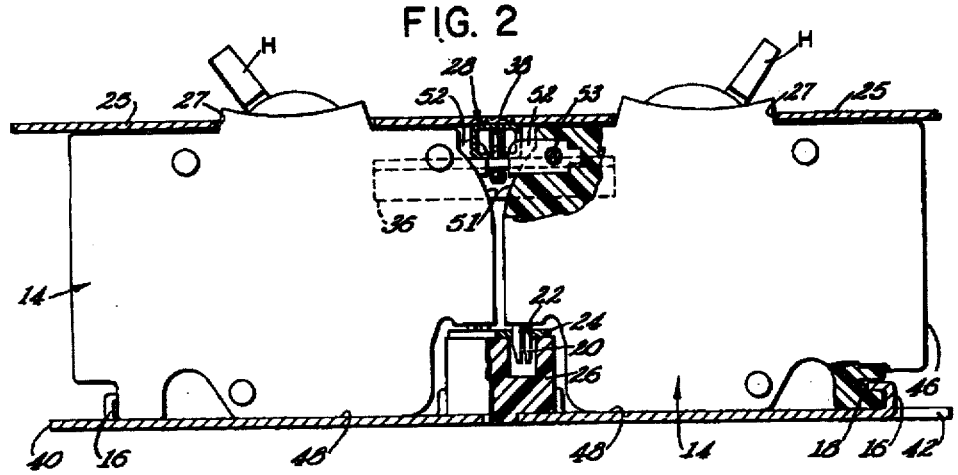
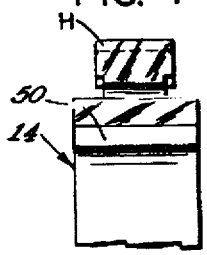 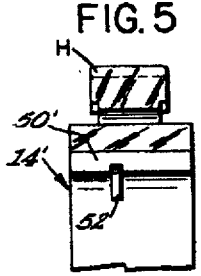 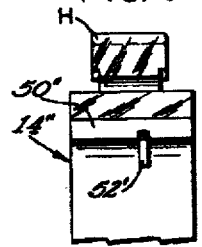 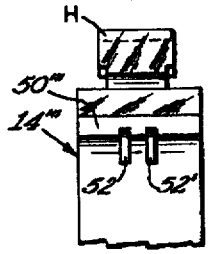
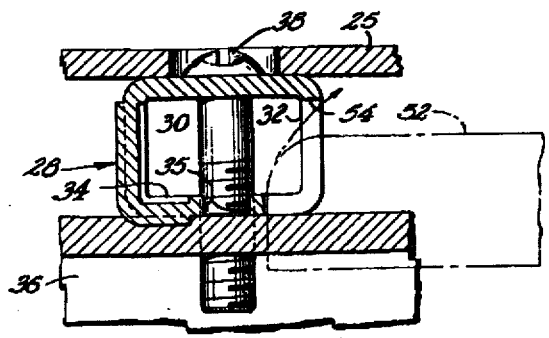
INVENTOR.
ALEXANDER R. NORDEN
BY Paul S Martin
ATTORNEY 3,119,051
Patented Jan. 21, 1964

3,119,051
CIRCUIT BREAKERS AND PANELBOARD ASSEMBLIES THEREFOR
Alexander R. Norden, New York, N.Y., assignor to Federal Pacific Electric Company, a corporation of Delaware
Filed Apr. 24, 1959, Ser. No. 808,713
11 Claims. (Cl. 317—119)

The present invention relates to improvements in circuit breakers and circuit breaker panelboard assemblies, particularly of the plug-in type.

Panelboards are generally manufactured as highly flexible units of modular design so as to receive circuit breakers of any desired ratings requisite for the installation, within a wide range of ratings, and the circuit breakers themselves are physically interchangeable in the panelboard, regardless of rating within a broad range. In wiring such a panelboard, a circuit breaker should be selected to protect each protected branch circuit corresponding to its wire gauge. In such a panelboard installation a circuit breaker may trip frequently due to circuit overloading, and to avoid the resulting inconvenience the user may substitute a heavier circuit breaker in the space occupied by the replaced breaker. The protection therefore afforded by the original breaker may be thus defeated and the replacement heavier breaker will not trip when a sustained excessive current is carried by the improperly protected branch-circuit wire.

It is accordingly the primary aim and object of the present invention to provide improved circuit breakers and panelboard assemblies therefor which are constructed to prevent the easy, indiscriminate later substitution of circuit breakers of heavy ratings in place of the previously installed circuit breakers of lower ratings. Pursuant to this object of the present invention the panelboard assembly includes circuit breaker receiving regions each of which is readily converted to receive circuit breakers of a selected rating, the circuit breakers themselves having structure characteristic of the rating thereof complementary to their companion circuit breaker receiving regions so as to be received only in said regions (or in a region of a higher rating). Thus worn out or defective circuit breakers can be readily replaced by others of corresponding ratings but a panelboard assembly which was originally modified for receiving a circuit breaker of any particular rating classification in any of the circuit breaker receiving regions may not be converted to receive a circuit breaker of higher rating except with specialized skill and with special tools.

Another object of the present invention is the provision of circuit breakers of different rating classifications of generally identical outline having characteristic provisions corresponding to the rating classifications thereof whereby circuit breakers of corresponding rating will be interchangeable and conversely circuit breakers of one rating will be non-interchangeable with circuit breakers of a higher rating. In accordance with the present invention, the characteristic structure identified with the rating classification of the breakers is different on the breakers of different rating classifications to provide for the aforesaid non-interchangeability. Further in accordance with the present invention the characteristic structure identified with the rating classification of the breakers is so arranged as to permit such breakers to be used with standard panelboards having standard circuit breaker receiving regions, if desired or required.

In its broader aspects, the present invention has application to the two types of circuit breakers which are presently in wide use, namely to those having screw-connectors for both the protected branch circuit and for the bus, respectively, as well as to the plug-in type of circuit breaker usually having a screw connector for the protected branch circuit and having a plug-in terminal for the bus on the panelboard. However, as will appear, certain features of the invention have particular application to the commonly used plug-in class of circuit breakers having a separable hinge coaction with the panelboard at one end of the circuit breaker and an electrical plug-in connection to the panelboard at the other end.

The nature of the invention and its further features and advantages will be more fully appreciated from the following detailed description of an illustrative embodiment thereof, which is shown in the accompanying drawings forming a part of the disclosure of the invention.

In the accompanying drawings:

FIG. 1 is a side elevational view of a portion of a panelboard assembly formed according to the present invention, said assembly having circuit breakers connected therein;

FIG. 2 is a sectional view taken along the line 2—2 of FIG. 1, the circuit breakers being shown in elevation;

FIG. 3 is an enlarged fragmentary perspective view of a portion of the panelboard rating classification member;

FIGS. 4, 5, 6 and 7 are fragmentary end views showing upper portions of circuit breakers of different current rating classifications; and FIG. 8 is a sectional view on an enlarged scale, taken along the line 8—8 of FIG. 1.

Referring now to the drawings in detail, there is shown a circuit breaker panelboard assembly 10 comprising a panelboard 12 having circuit breakers 14 mounted thereon, the panelboard and breakers illustrated being generally of the type shown and described in Patent No. 2,647,225, issued to T. M. Cole et al. on July 28, 1953, and assigned to the assignee herein, and differing therefrom in the respects to be described in detail below. The panelboard 12 illustrated has a plurality of modular spaces or regions R for receiving the breakers 14 which are generally standard in that their form and outline are substantially identical, and in that each is provided with a mechanical securing means at one end and a plug-in terminal connection at the other end. These circuit breakers are provided with distinguishing structure at an upper corner region which differ according to their respective current rating classifications as will be described below.

The panelboard 12 includes an integral hook 16 in each circuit breaker-receiving region R, and each breaker has a recess 18 that cooperates with hook 16 in the manner of a separable hinge during installation of the circuit breaker. When the circuit breaker is initially being installed, the circuit breaker as viewed in FIG. 2 (left side) slants upward to the right and the hook 16 and recess 18 are engaged in the manner of a separable hinge, and thereafter the circuit breaker is swung downwardly into the assembled position shown. Viewing FIG. 2, the breaker (right side) at its lower left hand corner portion has a plug-in metal terminal 20 that tightly engages a companion slot 22 of a metal bus bar 24 forming part of the panelboard. The bus bar 24 is mounted on a contact block unit 26 which is suitably secured to the panelboard. It will be understood that the panelboard is normally secured within an enclosure or to a suitable support (not shown). A trim plate 25 is positioned in surface-to-surface relation with the top surface of the circuit breakers connected in the panelboard and said trim plate is provided with openings 27 providing access to the operating handles H of the circuit breakers. The trim plate is detached from the panelboard assembly for the assembly and removal of the breakers with respect to the panelboard, the trim plate also serving as an enclosure (see FIG. 2) for member 28 to be now described.

Pursuant to the present invention, there is provided a rating classification member 28 extending transversely of the circuit breaker-receiving regions R of the panelboard in predetermined disposition therewith. The member 28 is in the form of a longitudinal channel member having opposite sidewalls 30 and 32 provided with in-turned flanges 34, the member 28 being substantially longitudinally coextensive with the panelboard and being secured in vertically spaced relation therewith in any suitable manner. The flanges 34 have their confronting edges 35 spaced from each other. In the illustrated embodiment, the member 28 is secured to angle brackets 36 (only one of which is shown in the drawings) at the opposite ends thereof by the one-way or clutch head screws 38 which prevent the normal or standard detachment of the member with respect to the panelboard, each bracket 36 being in turn secured to a suitable mounting part at or in proximity to the panelboard. The member 28 is disposed in a plane parallel to the plane of the panelboard and as shown in FIG. 2 is equidistant from the opposite sides 40 and 42 of the panelboard, the member being adapted to cooperate with circuit breakers mounted on both sides thereof.

The member 28 is provided with rating classification means oriented with each of the circuit breakers receiving regions R, said means being constituted by a companion pair of laterally spaced similar knockout strips 44 and 44' which are sheared so as to be removable only from the underside or from within the member. Thus the knockout strip may be readily punched out or removed by a suitable tool from the underside of the member 28 in the demounted condition thereof but may not be removed from the opposite or top side of the member and consequently are not removable in the installed condition of the panelboard assembly in which the bottom side of member 28 is substantially inaccessible for such knockout removal. Any desired number of knockouts may be provided in accordance with the range of circuit breaker ratings to be accommodated at each region. As shown in FIG. 8, the knockout strips 44 and 44' extend along both sidewalls 30, 32 of member 28 and along the flanges 34 thereof.

In practice, the knockout strips are left intact, or one or both knockout strips are removed to classify the region according to the rating classification of a mating circuit breaker, a removed knockout strip defining an opening or slot to accommodate a projecting corner portion of a circuit breaker characteristic of the rating of the breaker, as will be described below. Thus the knockouts or knockout strips are initially in place in the panelboard member 28 as supplied and each region to be used for a circuit breaker installation is classified at the desired rating in accordance with a circuit breaker designed to interfit therewith. The member 28 is thus conveniently classified in the demounted condition thereof and is subsequently secured to the brackets 36 for assembly with respect to the panelboard.

Circuit breaker 14 is basically of conventional construction and outline and the casing 46 thereof has a generally flat bottom wall 48 which seats against the generally flat wall of the panelboard. The casing 46 is provided with an upper corner portion 50 which is structurally characteristic of the rating classification of the breaker. Thus breaker 14 of the lowest rating classification as shown in FIG. 4 (for example a 15–20 amperes rating classification) has its casing 46 smoothly contoured and free of projecting portions at corner portion 50 and thus may be used at a region R without knockout removal whereby a region of member 28 is left intact for classifying the same at such lowest rating. The breaker 14' of next higher rating classification, as shown in FIG. 5 (for example 25–30 amperes) has its corner portion 50' provided with a projecting tab or portion 52 which is disposed to interfit in the slot or opening 54 defined by the removed knockout strip 44 on breaker assembly in the panelboard. Thus the region R of the panelboard is classified to the rating of breaker 14' by the removal of the single knockout 44 member 28 companion to that region. The portion 52 is preferably of metallic plate-like construction and extends into a complementary slot provided therefor in the casing and is suitably secured therein in any suitable manner, advantageously by the rivet 53 which secures the casing parts together. The portion 52 is disposed off-center to one side of the breaker casing to register in a companion opening 54. The breaker 14" of next higher rating, as shown in FIG. 6 (for example 35–40 amperes) corresponds in all respects to breaker 14' except that the portion 52' thereof is disposed off-center to the opposite side of the breaker casing to register in a companion slot 54'.

The portions 52 and 52' are disposed in the same relative position of the breaker casing except that said portions are disposed on opposite sides of the vertical center of the breaker casing, equidistant therefrom. Thus the region R of the panelboard is classified to the rating of breaker 14" by the removal of the single knockout 44' of member 28 companion to that region. The breaker 14'" of still higher rating as shown in FIG. 7 (for example 55–100 amperes) has its corner portion 50'" provided with a pair of projecting portions 52 and 52' which are disposed to register in the openings or slots 54 and 54', respectively defined by the removed knockout strips. It will be understood that the portions 52, 52' of breaker 14'" correspond in all respects to the portions 52, 52' previously described with reference to breakers 14' and 14". Thus a selected region R of the panelboard is classified to the rating of breaker 14'" by the removal of both knockouts of member 28 companion to that region.

Worn out or defective circuit breakers can thus be readily replaced by others of correspodnig or lower ratings in the corresponding classified region, except that breakers 14' and 14" are completely non-interchangeable. An improper breaker substitution however will be rejected by the knockout or knockouts remaining in place. Accordingly once a region has been classified as described above thereafter that region is limited against use of a circuit breaker having a heavier current rating.

The knockouts are inaccessible for normal removal in the installed condition of the panelboard assembly as this would require the disassembly of the member 28 from such assembly to obtain access to the underside of the member 28, to thereby forestall the easy and indiscriminate conversion of a region to a higher rating and improper breaker substitution in such region. One qualified however and with a knowledge of the installation may remove knockouts from member 28 by demounting the latter from the panelboard assembly by defeating the screws 38 to convert a region to a higher classification.

The circuit breakers aforedescribed may be used with standard panelboards having standard circuit breaker receiving regions since the generally flat casing wall 48 may be seated against the flat wall of a standard panelboard without interference from the projecting portions 52, 52'. These portions terminate short of the plane of the adjacent sidewall of the breaker casing as shown in FIG. 2.

It will be observed that the corner portion 50, 50', 50", 50'" of each breaker is contoured to define a smooth arcuate surface 51 which clears the member 28 during the swinging movement of assembly and disassembly of the breaker with respect to the panelboard. The slots 54, 54' defined by knockout removal are disposed and dimensioned to receive the projecting portions 52, 52' during the swinging movement of assembly of the breaker to the panelboard, each slot extending along a sidewall and adjacent flange of member 28 as shown in FIG. 8.

In this figure there is shown the disposition of a portion 52 in a slot 54 of member 28 in the installed condition of a breaker. Circuit breakers of a given rating may thus be replaced by others of the same rating whenever this proves necessary, first removing trim plate 25 but without disturbing member 28, and then by swinging the breakers to be removed and then installed about the respective separable hinge parts 16, 18.

Various additional modifications of the above embodiments of the invention will readily occur to those skilled in the art, and therefore the invention should be broadly construed in accordance with its full spirit and scope.

Having thus described my invention, what I claim as new and desire to secure by Letters Patent is:

1. A circuit breaker panelboard assembly, including a panelboard having means for securing a circuit breaker thereon in a circuit breaker mounting region, and a rating classification device secured to and fixedly disposed above the panelboard and overlying a marginal portion of said circuit breaker mounting region for classifying said region, said rating classification device being separated from said panelboard by a space sufficient for receiving a portion of a circuit breaker, said device having distinctively positioned displaceable rating classificaiton means, a selected one or more of said means at said region being displaceable from said device to accommodate removal and insertion of circuit breakers having corresponding distinctive projections characteristic of the rating thereof, said device being disposed in relation to said region in an effective manner for blocking the installation in said region of circuit breakers of heavier rating having other distinctive projections.

2. A circuit breaker panelboard assembly, including a panelboard having means for securing a circuit breaker thereon in a circuit breaker mounting region, and a rating classification device fixedly disposed above the panelboard and overlying a marginal portion of said circuit breaker mounting region, said rating classification device being separated from said penelboard by a space sufficient for receiving a portion of a circuit breaker, said device having a plurality of rating classification knock-outs, said knock-outs being selectively displaceable from said device to accommodate removal and insertion of circuit breakers having a distinctive formation characteristic of the rating thereof with said device rejecting from said region circuit breakers of heavier ratings having different distinctive formation, said knockouts being displaceable from said device only by pressure against one side thereof, said assembly including obstruction means adjacent to said knockouts and arranged to render access to said one side of each of said knockouts difficult.

3. A circuit breaker panelboard assembly, including a panelboard having means for securing a row of circuit breakers of rectangular outline thereon in aligned circuit breaker mounting regions, and a rating classification device fixedly disposed above said panelboard adjacent an upper corner of each circuit breaker to be mounted thereon, said panelboard having separable hinge means disposed to coact with the diagonally opposite corner of said circuit breakers, said device having distinctively positioned rating classification means at the side thereof opposite to said separable hinge means, one or more of said means at said region being selectively displaceable from said device to accommodate normal removal and mounting of circuit breakers having corresponding distinctive projections at a corner thereof with said device blocking the installation in said region of circuit breakers of heavier rating having other distinctive projections, said rating classification means being displaceable from said device only by access to one side thereof, and means adjacent to said rating classification means and forming part of said panelboard assembly for rendering said rating classification means relatively inaccessible at said one side.

4. A circuit breaker panelboard assembly in accordance with claim 3 further including means providing for the one-way fastening of said member to said panelboard to provide for said fixed disposition of said member and to defeat standard disassembly thereof.

5. A rating classification device for a circuit breaker panelboard, said device comprising a longitudinally extending channel member of sheet metal having rating classification means companion to the circuit breaker mounting region of said panelboard for predetermined overlying orientation therewith, said classification means comprising a plurality of distinctively positioned knockout strips removable by pressure from the inside only of said channel member to define a corresponding number of slots to accommodate a circuit breaker having a corresponding number of projections disposed for registry in said slots.

6. A rating classification device for a circuit breaker panelboard, said device comprising an elongated channel member having a regularly distributed series of rating knockout strips initially filling the openings in the side wall of the channel members but removable by pressure from the inside only of said channel member to define a number of slots to accommodate a circuit breaker having a corresponding number of projections disposed for registry in said slots, the opposite sidewalls of said channel having in-turned flanges, the confronting edges of said flanges being spaced from each other to define an access opening for knockout strip removal, each of said strips extending along a sidewall and adjacent flange of said channel.

7. In combination, a circuit breaker of generally rectangular outline and a panelboard assembly having a panel against which the bottom of said circuit breaker is mounted and a rating classification device spaced from said panel and secured by one-way screw means adjacent to and overlying a top corner of the circuit breaker for classifying said region, said panel and said circuit breaker having separable hinge means diagonally opposite said device, said circuit breaker and said panelboard assembly having mating plug-in terminal means below said device, said device having distinctively positioned rating classification knockouts displaceable form said device from the bottom side thereof only, one or more of said knockouts being selectively displaceable from said device for classifying said region according to the rating classification of the mounted circuit breaker, said circuit breaker having distinctive means characteristic of the rating thereof including a projecting metal blade at a top corner thereof, the broad face of the blade lying in the plane of swing of the circuit breaker about said hinge means, to interfit with a companion slot in said device as well as during insertion and removal, said region rejecting circuit breakers of heavier ratings having other distinctive means.

8. In combination, a series of circuit breakers of various rating classifications, and a panelboard assembly to receive said circuit breakers in modular circuit breaker receiving regions thereof, said assembly comprising a panelboard and a rating classification device spaced from said panelboard and fixed in predetermined relation therewith for classifying said regions, said device at each of said regions having a plurality of distinctively positioned rating classification knockouts removable from said device from the bottom side thereof only for classifying each region according to the rating classification of the mounted circuit breaker, each of said circuit breakers having a distinctive formation characteristic of the rating thereof to interfit with said device in a region of corresponding rating classification in the mounted condition thereof, said distinctive formation of each circuit breaker of different rating classification being different with the device at each region rejecting circuit breakers of heavier ratings than the classification thereof, said device comprising a longitudinally extending channel member disposed medially of said panelboard thereabove in a plane parallel to the plane of said panelboard, said member extending transversely of said regions and said mounted circuit breakers and being disposed to accommodate removal and replacement of like circuit breakers with said rating classification device fixed in place.

9. A circuit breaker panelboard assembly including a panelboard having means for securing a row of circuit breakers of rectangular outline thereon in aligned circuit breaker mounting regions, and a rating classification device fixedly disposed above said panelboard adjacent an upper corner of each circuit breaker to be mounted thereon, said panelboard having separable hinge means disposed to coact with the diagonally opposite corner of said circuit breakers, said device comprising an elongated channel member of sheet metal extending across said aligned circuit breaker mounting regions, the sidewalls of said channel member being provided with a regularly distributed series of rating clasisfication knockouts removable by pressure from the inside only of said channel member to provide openings for accommodating rating-clasisfication projections of circuit breakers disposed for registry in said openings, said channel member having a bottom between said sidewalls and having an open side opposite said bottom, said open side facing said panelboard, the opposite sidewalls of said channel having inturned flanges the confronting edges of which are spaced from each other to define a constricted opening for knockout removal.

10. A circuit breaker adapted to be mounted in interfitting relation in a region of a panelboard assembly corresponding to the rating classification of the breaker, said circuit breaker comprising a generally rectangular casing having mutually opposite top and bottom faces and mutually opposite end walls, an operating handle projecting from and identifying the top face of said casing, projecting means including at least one distinctive rating classification projection extending form one of said end walls at a portion of said generally rectangular casing adjacent said top face, said projecting means being disposed at a distinctive part of the width of the end wall as a characteristic of the rating of the breaker, and said circuit breaker having a separable-hinge formation at the corner of the circuit breaker casing diagonally opposite said rating-classification projecting means.

11. A series of circuit breakers of different rating classifications of generally identical rectangular outline, the rectangular outline of each circuit breaker including a front face, two end walls, and a bottom face, and each circuit breaker having an operating handle projecting from and identifying said front face thereof and each circuit breaker having a predetermined number of distinctive rating classification projections extending from one of said end walls thereof adjacent said front face thereof, the projections being disposed distinctively differently in relation to the width of the end wall in accordance with different current rating classifications of the circuit breakers for interengagement with a panelboard assembly at regions corresponding to the respective rating classifications of the breakers, said circuit breakers having separable hinge formations at the corners thereof diagonally opposite to said projections for coaction with complementary panelboard separable hinge formations.

References Cited in the file of this patent

UNITED STATES PATENTS

| | | |
|---|---|---|
| 1,930,028 | Adam | Oct. 10, 1933 |
| 2,281,958 | Snavely | May 5, 1942 |
| 2,883,587 | Dorfman | Apr. 21, 1959 |
| 2,910,629 | Casey | Oct. 27, 1959 |
| 2,910,630 | Hammerly | Oct. 27, 1959 |
| 2,916,675 | Middendorf | Dec. 8, 1959 |
| 2,929,966 | Bangert | Mar. 22, 1960 |
| 2,946,928 | Slade | July 26, 1960 |
| 3,046,453 | Martin | July 24, 1962 |